(12) United States Patent
Harris (10) Patent No.: US 7,162,717 B1
(45) Date of Patent: Jan. 9, 2007

(54) COMPRESSED FILE PATCHER

(75) Inventor: Peter Harris, Edmonton (CA)

(73) Assignee: Intuit Inc., Mountain View, CA (US)

( * ) Notice: Subject to any disclaimer, the term of this patent is extended or adjusted under 35 U.S.C. 154(b) by 848 days.

(21) Appl. No.: 10/259,280

(22) Filed: Sep. 26, 2002

(51) Int. Cl.
*G06F 9/44* (2006.01)

(52) U.S. Cl. .................................................. 717/168

(58) Field of Classification Search .................. None
See application file for complete search history.

(56) References Cited

U.S. PATENT DOCUMENTS

| | | | | |
|---|---|---|---|---|
| 5,581,684 | A * | 12/1996 | Dudzik et al. | 715/708 |
| 6,005,569 | A * | 12/1999 | Breggin | 715/711 |
| 6,667,747 | B1 * | 12/2003 | Spellman et al. | 715/714 |
| 6,772,110 | B1 * | 8/2004 | Real et al. | 704/8 |
| 2002/0015056 | A1 * | 2/2002 | Weinlaender | 345/705 |
| 2003/0030668 | A1 * | 2/2003 | Morrison | 345/745 |
| 2004/0044635 | A1 * | 3/2004 | Gordon et al. | 706/50 |
| 2005/0044544 | A1 * | 2/2005 | Slivka et al. | 717/174 |

OTHER PUBLICATIONS

Cozzens et al., JavaScript Tutorial, 1998.*
Roche, HTML Help, 1998.*
Zubak, Microsoft's HTML Help is not just for Help systems, 1997.*

* cited by examiner

*Primary Examiner*—Kakali Chaki
*Assistant Examiner*—Insun Kang
(74) *Attorney, Agent, or Firm*—Fenwick & West LLP (57) ABSTRACT

Content concerning a desired topic is loaded from the compressed file into a frame. An attempt is made to access an updated content file concerning the desired topic outside of the compressed file, and load it into another frame. If the attempt is successful, the updated content file is displayed. Otherwise, the content concerning the desired topic from the compressed file is displayed.

20 Claims, 5 Drawing Sheets

Control Script 107 if (running in top frame)
   start frame manager script
else [visible and hidden frame already created]
   if (running in visible frame)
     if (hidden frame empty)
       attempt to access more recent version of content and load it into hidden frame
       exit, allowing display of content of visible frame
     else [hidden frame not empty]
       exit, allowing display of content of visible frame
   else [running in hidden frame]
     load content from hidden frame into visible frame

---

Frame Manager Script 201 create visible frame create hidden frame load indicator into hidden frame indicating that it is empty load content from top frame into visible frame

First Instance of Control Script            <u>107.1</u> if (running in top frame)
   start frame manager script
else [visible and hidden frame already created]
   if (running in visible frame)
     if (hidden frame empty)
       attempt to access more recent version of content and load it into hidden frame
       exit, allowing display of content of visible frame
     else [hidden frame not empty]
       exit, allowing display of content of visible frame
   else [running in hidden frame]
     load content from hidden frame into visible frame

Frame Manager Script            <u>201</u> create visible frame
create hidden frame
load indicator into hidden frame indicating that it is empty
load content from top frame into visible frame

Second Instance of Control Script            <u>107.2</u> if (running in top frame)
   start frame manager script
else [visible and hidden frame already created]
   if (running in visible frame)
     if (hidden frame empty)
       attempt to access more recent version of content and load it into hidden frame
       exit, allowing display of content of visible frame
     else [hidden frame not empty]
       exit, allowing display of content of visible frame
   else [running in hidden frame]
     load content from hidden frame into visible frame

FIG. 4

COMPRESSED FILE PATCHER

BACKGROUND

1. Field of Invention

The present invention relates generally to access of compressed data, and specifically to allowing access of updates to data stored in a compressed file, without requiring that the entire compressed file be updated.

2. Background of Invention

Compressed HTML has become an important standard format for help files for software applications. Software developers use HTML for help files because of the ease with which help information can be written in HTML by non-programmers. However, because today's software programs are often very complex, the amount of help information required can be so extensive that it would be too large to practically distribute all of the help files in uncompressed format.

In order to use compressed HTML for help files, numerous, separate HTML files, each one typically associated with a single help topic, are compressed and compiled into a single file in Compressed HTML ("CHM") format. The result is a reasonably sized file that includes information on a plurality of help topics. When a user requests help on a desired topic, an HTML help engine (for example, the Microsoft® HTML Help Engine) locates the relevant compressed information in the CHM file and uncompresses it into HTML for display by the user's browser.

For these reasons, the CHM standard is useful for distributing and accessing help data, as well as for large amounts of information on other topics. However, such information often needs to be updated, and in this regard the CHM standard has a substantial shortcoming. While a CHM file typically includes compressed HTML files for a large number of different topics, it is often desirable to update the information for only a small number of topics, or even on a single topic. Because a CHM file is compressed, in order to update even a single topic file within the compressed file, a new CHM file must be compiled that includes not only the updated topic, but all of the unchanged topics as well.

For example, suppose a CHM help file for a commercial software program is five megabytes in size. If the developer wished to update a single topic file only, the updated topic file would likely be very small, perhaps only ten kilobytes. Yet, the developer would have to compile a new CHM file that includes the new topic file, as well as all of the unchanged topic files. Because of the way compression algorithms operate, the new CHM file would be different all the way through. Thus, the developer would have to distribute a new five megabyte file merely to update a single ten kilobyte topic file. If the application is used by thousands or perhaps millions of users (which is common for very popular applications), then even the online distribution of the updated CHM file would be difficult and costly, requiring significant online bandwidth and time. Clearly, this limits developers to updating CHM files only in significant product releases.

The problem with updating CHM files results from the design and operation of the HTML help engine. The HTML help engine is not under the control of the application developer (for example, the Microsoft® HTML Help Engine is part of the Windows 2000 operating system provided by Microsoft Corp). When a developer uses the CHM standard to distribute help topic files, the developer is relying on a third party HTML help engine to locate the topic file in the CHM file associated with the help topic requested by the user. Because of its internal configuration and design, this third party HTML help engine only attempts to locate the topic file in the CHM file. The developer cannot reprogram the help engine to check elsewhere for an updated HTML file.

It will be apparent to one of ordinary skill in the relevant art that this problem applies not only to CHM files used for providing online help to software users, but can apply in general to compressed files that include multiple topic files.

What is needed is an approach that allows access of the most recent version of information on a topic stored in a compressed file accessed by a third party retrieval engine, without requiring that the entire compressed file be updated.

SUMMARY OF INVENTION

To overcome the limitations of existing help engines, one embodiment of the present invention uses the ability of a browser to execute a script which determines whether an updated file corresponding to a selected HTML file is available from a local or remote storage device. If an updated file is available, then it is retrieved and displayed by the browser, instead of the original HTML file contained in the CHM file. If an updated file is not available, then the original HTML file from the CHM file is displayed. In this way, the original CHM file does not have to be modified after it is distributed to users. Rather, the software developer need only make the updated individual HTML files available. This approach eliminates the need to recompile and redistribute the CHM file each time an update is made to one of the included HTML files.

In one embodiment of the present invention, the most recent available version of content concerning a desired topic is displayed to a user on a computer system. Content concerning a plurality of topics is stored in a compressed file. Content concerning a desired topic is accessed by a third party retrieval engine, and loaded into an HTML frame. However, rather than simply displaying the content concerning the desired topic from the compressed file, a script is run in response to loading the content into the frame. The script attempts to access an updated content file outside of the compressed file. If an updated content file is located, the updated content file is displayed to the user. Otherwise, the content concerning the desired topic from the compressed file is displayed.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

Figure 1A:
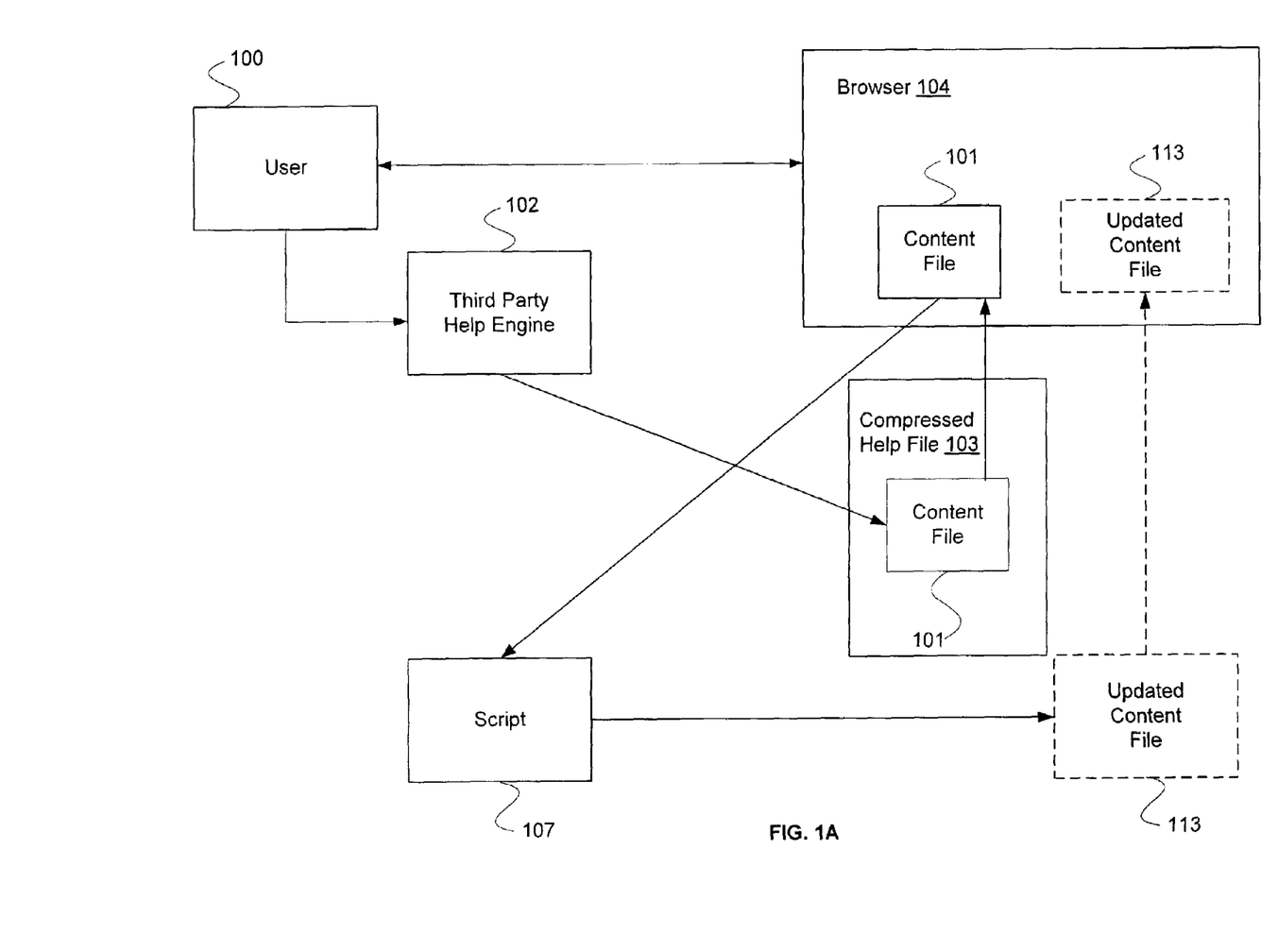
FIG. 1A is a block diagram illustrating a high level overview of one embodiment of the present invention.

FIG. 1A illustrates a high level overview of one embodiment of the present invention. A user 100 attempts to view content concerning a desired topic; the content is stored in a file 101 that is compiled in a compressed help file 103. A third party help engine 102 reads the compressed help file 103, and therein accesses the content file 101. The help engine 102 then loads the content file 101 into the user's browser 104. In response to loading the content file 101, the browser 104 runs a control script 107 which attempts to access an updated version 103 of the content file 101. The updated file 103 is located outside of the compressed help file 103, and may be stored locally on the user's computer, or remotely at a network location accessible to the browser 104. If the control script 107 is able to access an updated file 103, the updated file 103 is loaded into the browser 104 and is displayed to the user. Otherwise, the original content file 101 from the compressed help file 103 is displayed.

Figure 1B:
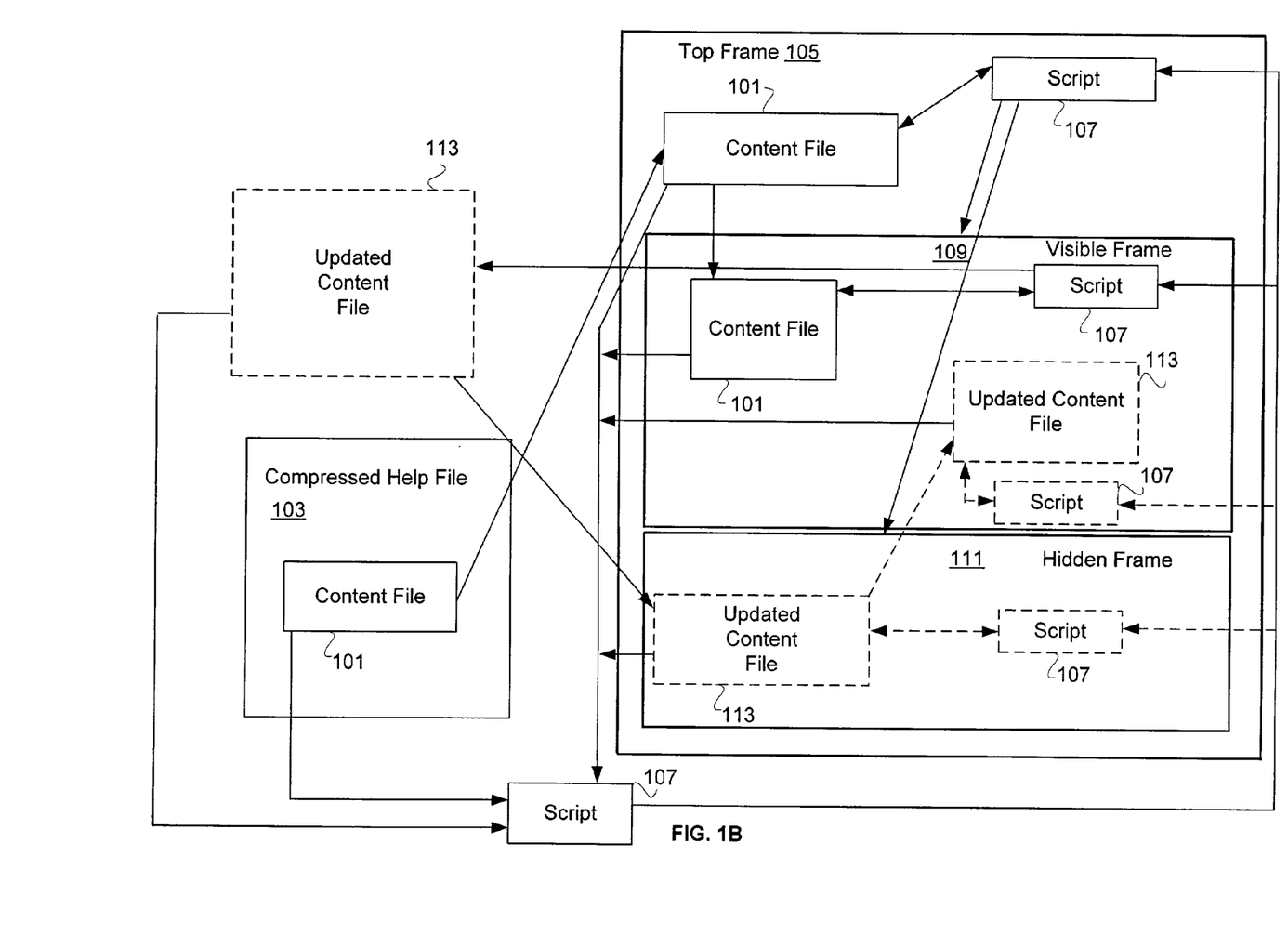
FIG. 1B is a block diagram illustrating a more detailed overview of the present invention, according to one embodiment.

FIG. 1B further illustrates one embodiment of the present invention. Content file 101 concerning a desired topic is loaded from a compressed help file 103 into a top frame 105. It will be understood by one of skill in the art that the content file 101 will typically be loaded into the top frame 105 when a user of a software program requests help on a desired topic.

The loading of the content file 101 into the top frame 105 causes a control script 107 to execute in the top frame 105. The content file 101 is such that loading it into a frame automatically causes execution of the control script 107 in the frame. Running a control script 107 in a frame in response to the loading of the control script 107 is discussed in detail below. The frames are preferably defined in Hypertext Markup Language ("HTML"), or other markup languages. The control script 107 can comprise Java Script, or other scripting languages.

By executing logic described below, the control script 107 creates a visible frame 109 and a hidden frame 111, and loads the content file 101 concerning the desired help topic from the top frame 105 into the visible frame 109. The control script 107 attempts to access an updated content file 113 corresponding to the content file 101, and if available loads the updated content file 113 into the hidden frame 111. Generally, the control script 107 attempts to access the updated content file 113 by attempting to open an appropriately named file in a predetermined location, such as a folder with a specific name, or identified by an environment variable, URL, or other identifier. If an updated content file 113 is not found, the content file 101 from the compressed help file 103, which is in the visible frame 109, is displayed. If an updated content file 113 is found, the script loads the updated content file 113 from the hidden frame 111 into the visible frame 109, where it is displayed.

It will be understood by those of ordinary skill in the relevant art that the content file 101 described above and illustrated by FIGS. 1A and 1B is only an example of one possible type of content file 101. In other embodiments, the compressed file 103 need not be a "help" file (i.e., providing information for helping users of a software application), but can instead contain any type of information or content.

Figure 2:
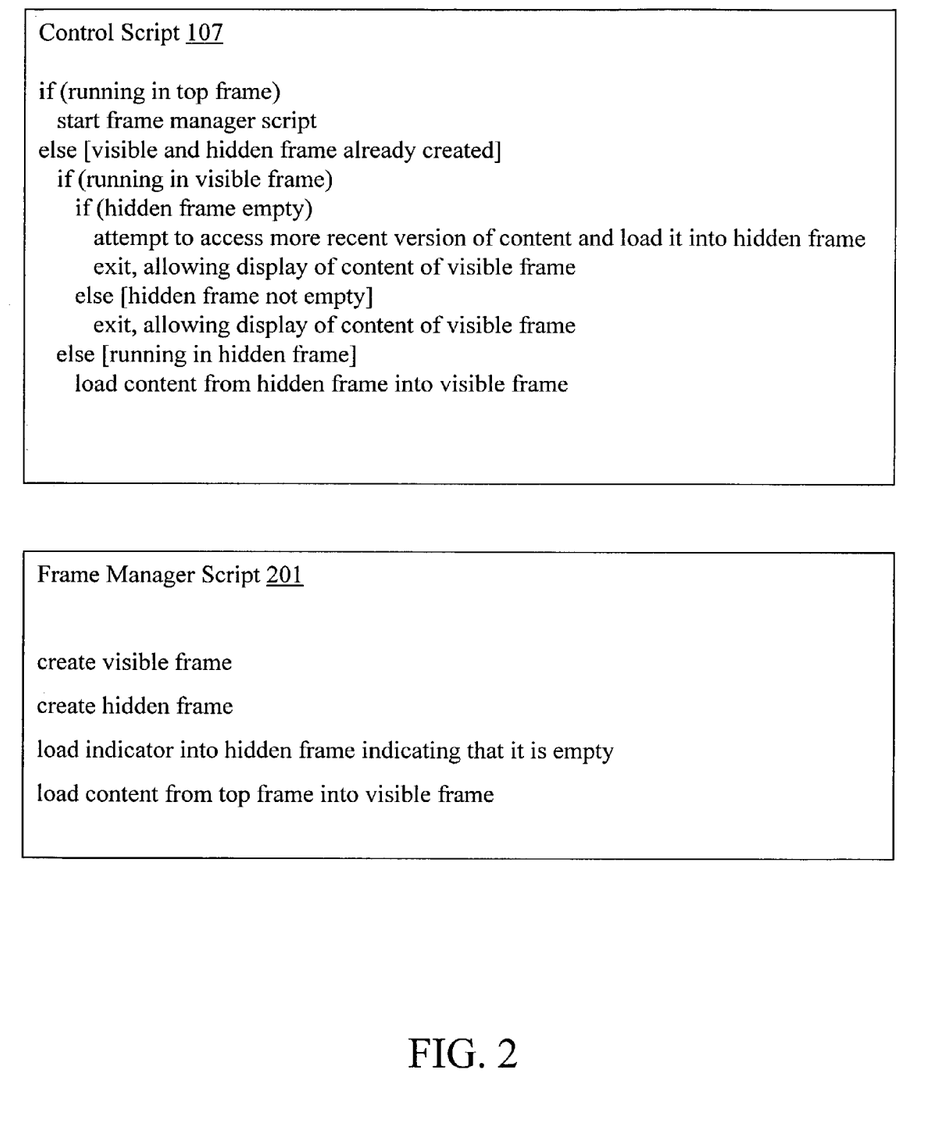
FIG. 2 illustrates scripts that perform steps for accessing the most recent version of content, according one embodiment of the present invention.

FIG. 2 illustrates a control script 107 that is run when content file 101 is loaded into a frame, according to one embodiment of the present invention. It is to be understood that FIG. 2 illustrates pseudo-code outlining the logic of the control script 107, not actual code in any specific programming language. It will be readily apparent to one of ordinary skill in the art that the illustrated logic could be coded in various ways. The specific scripting language and instructions used to implement the illustrated logic are a design choice. Additionally, the same results can be achieved through the coding of similar but not identical logic. All of these variations are within the scope of the present invention.

Referring to FIG. 2, the logic of the control script 107 is as follows. Generally, the control script 107 can operate recursively, in that it is designed to be invoked multiple times. Upon each invocation, the script variously determines which frame it is running in, and whether and what content has been loaded into that frame. The results of this testing determine whether an updated content file 113 is available and loaded, and control the display of either the content file 101 from the compressed file 103 or the updated content file 113.

Thus, in FIG. 2, the control script 107 determines if it is running in the top frame 105. This will always be true the first time the control script 107 runs, because the first time content file 101 is loaded from the compressed file 103, the content file 101 is loaded into the top frame 105. If the control script 107 determines that it 107 is running in the top frame 105, the control script 107 starts a frame manager script 201. The frame manager script 201 creates a visible frame 109, and a hidden frame 111. The frame manager script 201 loads the content file 101 from the top frame 105 into the visible frame 109. The frame manager script 201 can also load an HTML indicator 707 into the hidden frame 111, the indicator 707 serving to indicate that the newly created hidden frame 111 is empty. In some embodiments, the indicator 707 can be in a format other than HTML, and in other embodiments no formal indicator 707 is required to indicate that the hidden frame 111 is empty. Loading the content file 101 into the visible frame initiates a recursive invocation of the control script 107 ("second control script 107") to run in the visible frame 109 (this is discussed below).

Returning to the control script 107 executing in the top frame, if the first control script 107 is not running in the top frame 105, it 107 next determines if it 107 is running in the visible frame 109. This will be true when the control script 107 has been started by the frame manager script 201, as discussed above. Recall that under these circumstances, the visible frame 109 will contain the content file 101 from the compressed file 103, and the hidden frame 111 will be empty. If the control script 107 determines that it is running in the visible frame 109, it next 107 determines if the hidden frame 111 is empty (which it will be under the circumstances being described).

If the control script 107 determines that the hidden frame 111 is empty, the control script 107 attempts to access an updated version 113 of the content file 101 outside of the compressed file 103. If an updated content file 113 exists, the control script 107 loads the updated content file 113 into the hidden frame 111, thereby causing another instance of the control script 107 to run in the hidden frame 111 (this will result in displaying the updated version 113 of the content file 101, as explained below). If an updated content file 113 does not exist, the script allows the content file 101 from the compressed file 103, which is in the visible frame 109, to be displayed.

When the control script 107 is executed within the hidden frame 111, the control script 107 loads the content of the hidden frame 111 (which will be the updated content file 113, as explained above) into the visible frame 109, causing another instance of the control script 107 to run in the visible frame. This will result in the display of the updated content file 113, which is now in the visible frame 109.

The control script 107 and the frame manager script 201 may be included in the CHM file itself, or reside externally to the CHM file, either locally on the user's storage device or at an accessible network location. In one embodiment, the scripts are included in the directory used by the application with which the CHM file is associated. It will be readily apparent to one of ordinary skill in the relevant art that in other embodiments, the inventive functionality described herein could be implemented in more or fewer scripts, or with a different division between scripts. All such embodiments are within the scope of the present invention.

Figure 3:
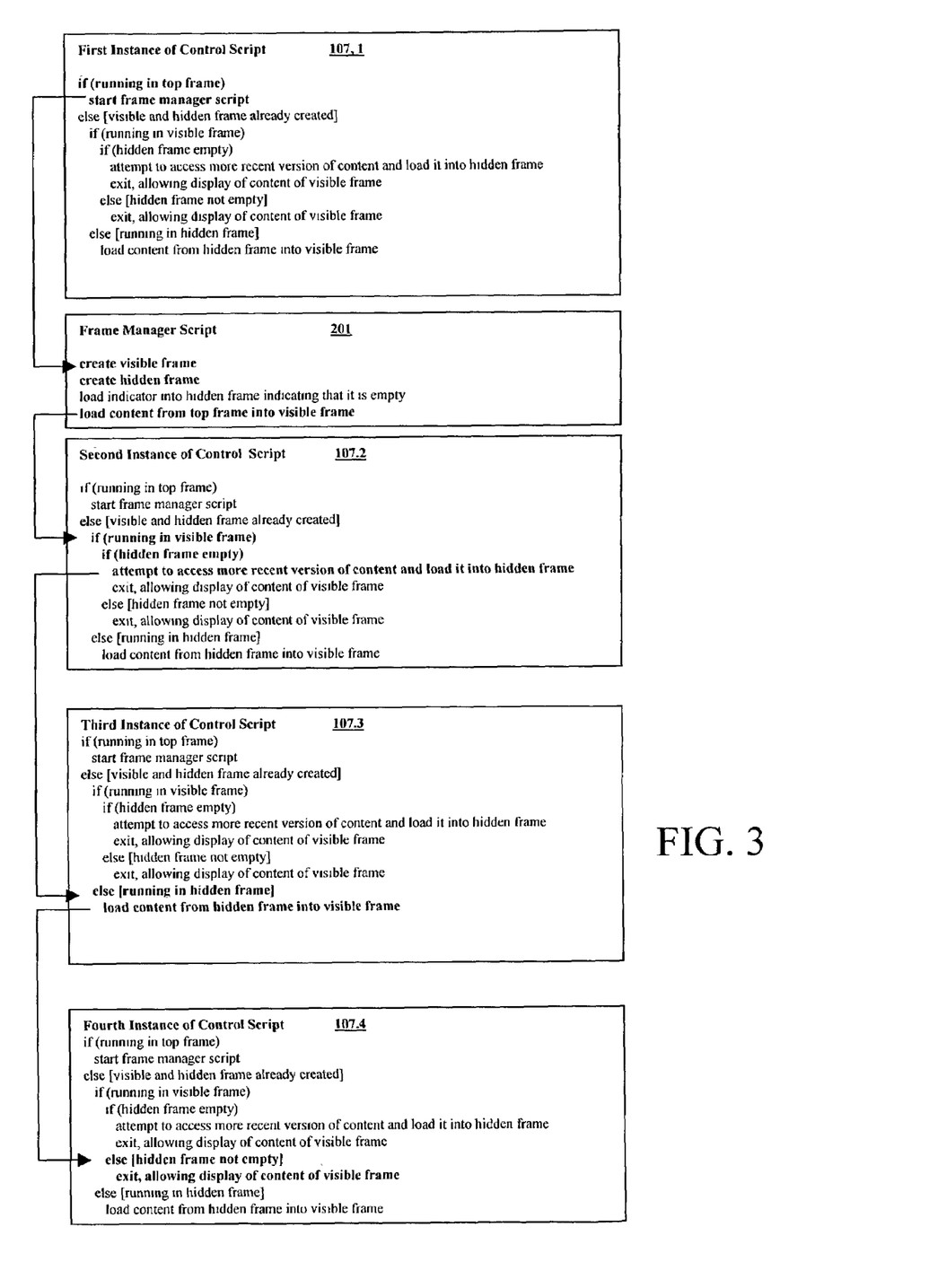
FIG. 3 is a code flow diagram illustrating steps executed by the script when an updated content file is accessed outside of the compressed file, according to one embodiment of the present invention.

FIG. 3 illustrates steps executed by the control script 107 when an updated content file 113 is accessed outside of the compressed file 103, according to one embodiment of the present invention. For each instance of the control script 107 that is executed within a frame, the lines of code executed by that instance are shown in bold, to assist in following the logic of the overall methodology. For reference, each instance of the control script 107 is indicated in the figure by a respective subscript attached to the reference number "107".

When content file 101 concerning a desired topic is loaded from the compressed file 103 into the top frame 105, a first instance of the control script 107.1 runs in the top frame 105. The first instance of the control script 107.1 determines that it is running in the top frame 105, and starts the frame manager script 201.

The frame manager script 201 creates a visible frame 109 and a hidden frame 111, and loads the content file 101 concerning the desired topic from the top frame 105 into the visible frame 109. Loading the content file 101 into the visible frame 109 causes a second instance of the control script 107.2 to run in the visible frame 109.

The second instance of the control script 107.2 determines that it is running in the visible frame 109, and determines that the hidden frame 111 is empty. Responsive to these determinations, the second instance of the control script 107.2 attempts to access an updated content file 113, and if available loads the updated content file 113 into the hidden frame 111. Loading the updated content file 113 into the hidden frame 111 causes a third instance of the control script 107.3 to run in the hidden frame 111.

The third instance of the control script 107.3 determines that it is not running in the top frame 105, and that it is not running in the visible frame 109. Responsive to these determinations, the third instance of the control script 107.3 loads the updated content file 113 from the hidden frame 111 into the visible frame 109, causing a fourth instance of the control script 107.4 to run in the visible frame 109.

The fourth instance of the control script 107.4 determines that it is not running in the top frame 105, that it is running in the visible frame 109, and that the hidden frame 111 is not empty. In response, the fourth instance of the control script 107.4 exits, allowing the updated content file 113, which is in the visible frame 109, to be displayed to the user.

Figure 4:
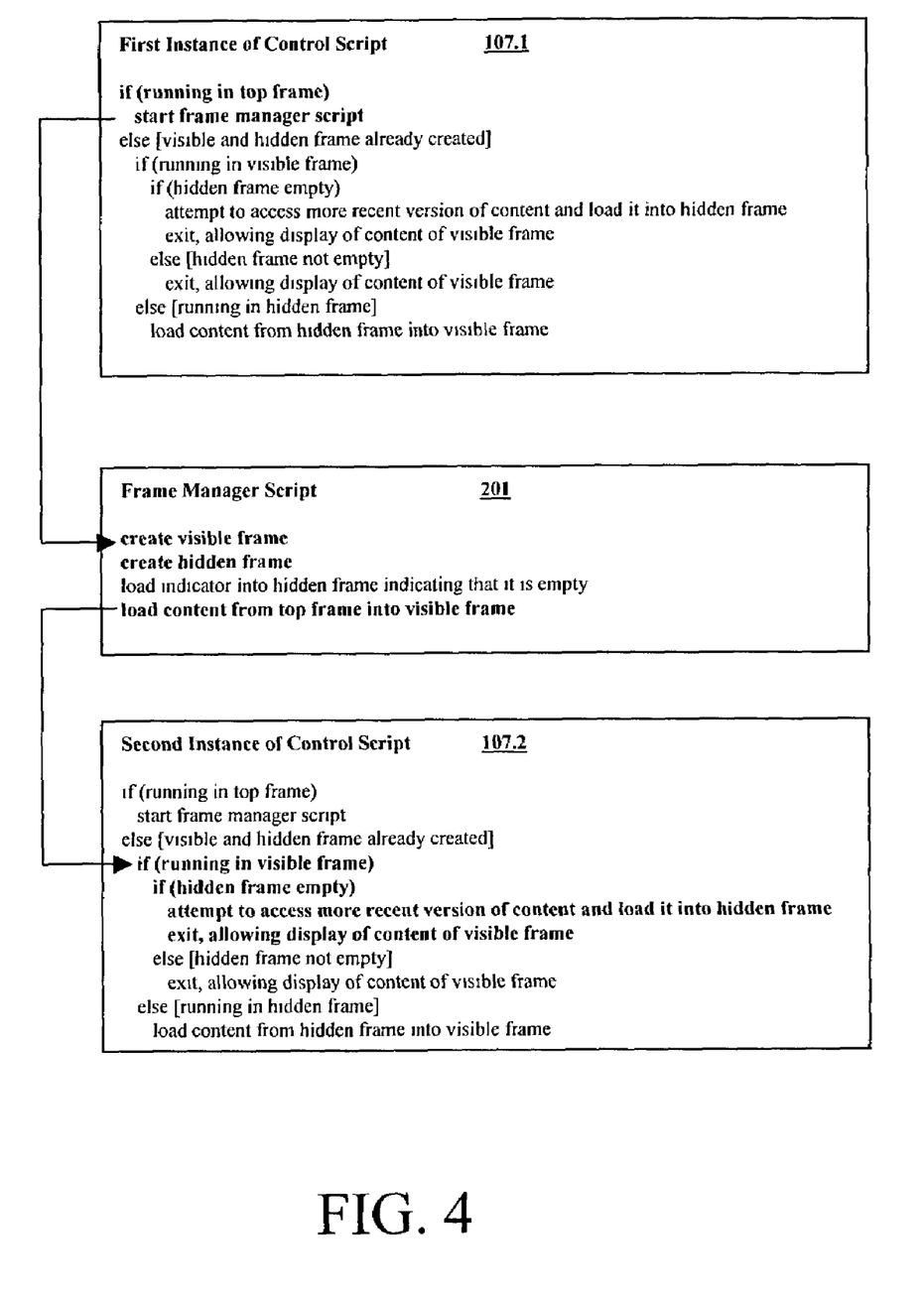
FIG. 4 is a code flow diagram illustrating steps executed by the script when there is no updated content file outside of the compressed file, according to one embodiment of the present invention.

FIG. 4 illustrates steps executed by the control script 107 when there is no updated content file 113 available, according to this embodiment of the present invention. When the content file 101 is loaded from the compressed file 103 into the top frame 105, the first instance of the control script 107.1 runs in the top frame 105. As before, the first instance of the control script 107.1 determines that it is running in the top frame 105, and starts the frame manager script 201.

The frame manager script 201 creates a visible frame 109 and a hidden frame 111, and loads the content file 101 concerning the desired topic from the top frame 105 into the visible frame 109. Loading the content file 101 into the visible frame 109 causes a second instance of the control script 107.2 to run in the visible frame 109.

The second instance of the control script 107.2 determines that it is running in the visible frame 109, and determines that the hidden frame 111 is empty. Responsive to these determinations, the second instance of the control script 107.2 attempts to access an updated content file, outside of the compressed file 103. Because there is no updated content file 113 available, the attempt to access one is not successful. In response, the second instance of the control script 107.2 exits, allowing the content file 101 from the compressed file 103, which is in the visible frame 109, to be displayed to the user.

It is to be understood that the present invention is not limited to help files. The present invention is well suited for "patching" any set of files that are stored in the CHM (or similar) format, and in some embodiments, that is how it is utilized. In some embodiments, the present invention accesses a CHM file containing a plurality of HTML files comprising content files 101 on topics other than software help. Additionally, in other embodiments, the compressed file 103 can be in a format other than CHM, and the compressed data therein can be in a format other than HTML.

As stated above, the content file 101 is such that whenever it is loaded into a frame by the browser, the control script 107 is executed, thereby initiating the logic flow which attempts to locate and load an updated content file 113. This automatic invocation of the control script 107 may be done in at least two different ways. In one embodiment, the control script 107 is embedded in the HTML of the content file 101 itself, using the SCRIPT tag to indicate the script. For example, in JavaScript, the following would be used to embed the control script 107:

<script language="JavaScript">
//control script code here//
</script>

Alternatively, in another embodiment, the control script 107 can be stored externally to the content file 101, and accessed by including a reference (pointer, URL, or other reference mechanism) to the control script 107 within the content file 101. For example, using JavaScript the content file 101 can contain a reference to the control script such as follows using the SRC attribute of the SCRIPT tag:

<script language="JavaScript" src="control_script.js">
</script>

Here, the control script 107 is simply a text file containing JavaScript code, and whose filename ends with the extension ".js". In either embodiment, whenever the content file 101 is loaded into a frame, the control script 107 runs in the frame.

As will be readily apparent to one of ordinary skill in the relevant art, a number of equivalent variations are possible, and all are within the scope of the present invention. For example, rather than a reference to the script, a pointer to the control script 107 is possible, or a reference to another script file which in turn invokes the control script 107.

As described, above, the control script 107 attempts to access the updated content file 113, either on the user's local storage device or via a network. If the updated content file 113 is to be found locally, then the control script 107 can use a predetermined path name to a directory on the storage device. The pathname will be previously established as the directory into which updated content files 113 can be stored. If the updated content file 113 is to be found at a network location, then the script can contain the URL to that location. This option is useful because it allows the URL to reference a location at the developer's website, and thereby enables the developer to post the updated content file 113 on its website, without having to distribute the file out to the users. In this way the updated content file 113 is accessed only by those users who need it, thereby avoiding distribution to those who do not need to access the file. In either of these embodiments, the updated content file 113 can be a hypertext language file (or in other embodiments, a file in another format), and it can be a compressed file, or it can be uncompressed.

As will be understood by those familiar with the art, the invention may be embodied in other specific forms without departing from the spirit or essential characteristics thereof. Likewise, the particular naming and division of the modules, scripts, features, attributes, methodologies and other aspects are not mandatory or significant, and the mechanisms that implement the invention or its features may have different names, divisions and/or formats. Furthermore, as will be apparent to one of ordinary skill in the relevant art, the modules, scripts, features, attributes, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for allowing display of the most current available version of content concerning a desired help topic, without requiring an update of an entire compressed help file, the method comprising:

loading content concerning a desired help topic from the compressed help file into a top frame;

running a script in the top frame, responsive to loading the content concerning the desired help topic into the top frame;

responsive to determining that the script is running in the top frame, creating a visible frame and a hidden frame, and loading the content concerning the desired help topic from the top frame into the visible frame;

running a second instance of the script in the visible frame, responsive to loading the content concerning the desired help topic into the visible frame;

attempting to access an updated content file concerning the desired help topic outside of the compressed help file, responsive to determining that the second instance of the script is not running in the top frame, that the second instance of the script is running in the visible frame, and that the hidden frame is empty;

in response to results of attempting to access the updated content file concerning the desired help topic, performing one of the following steps:

displaying the updated content file concerning the desired help topic, in response to successfully attempting to access the updated content file concerning the desired help topic; or displaying the content concerning the desired help topic from the compressed help file, in response to unsuccessfully attempting to access the updated content file concerning the desired help topic.

2. The method of claim 1, wherein the following additional steps are performed in response to successfully attempting to access the updated content file concerning the desired help topic:

loading the updated content file concerning the desired help topic into the hidden frame;

running a third instance of the script in the hidden frame, responsive to loading the updated content file concerning the desired help topic into the hidden frame;

loading the updated content file concerning the desired help topic into the visible frame, responsive to determining that the third instance of the script is not running in the top frame, and that the third instance of the script is running in the hidden frame;

running a fourth instance of the script, responsive to loading the updated content file concerning the desired help topic into the visible frame; and wherein displaying the updated content file concerning the desired help topic, in response to successfully attempting to access the updated content file concerning the desired help topic further comprises:

displaying the content of the visible frame, responsive to determining that the fourth instance of the script is not running in the top frame, that the fourth instance of the script is running in the visible frame, and that the hidden frame is not empty.

3. The method of claim 1, wherein displaying the content concerning the desired help topic from the compressed help file, in response to unsuccessfully attempting to access the updated content file concerning the desired help topic further comprises:

displaying the content of the visible frame.

4. The method of claim 1 wherein:

the compressed help file comprises a file in the compressed Hypertext Markup Language format, such that the compressed help file comprises a plurality of compressed Hypertext Markup Language files, each Hypertext Markup Language file comprising content concerning an individual help topic.

5. The method of claim 4 wherein:

each Hypertext Markup Language file comprising content concerning an individual help topic is configured such when the file is loaded into a frame, the script will run.

6. The method of claim 5 wherein:
each Hypertext Markup Language file includes a reference to the script.

7. The method of claim 5 wherein:
each Hypertext Markup Language file includes an instance of the script.

8. The method of claim 1 wherein:
the script comprises Java Script.

9. The method of claim 1 further comprising:
running a frame manager script, responsive to determining that the script is running in the top frame.

10. The method of claim 9, wherein the following steps are performed by the frame manager script:
creating a visible frame;
creating a hidden frame; and
loading the content concerning the desired help topic from the top frame into the visible frame.

11. The method of claim 10, the frame manager script also performs the following step:
loading into the hidden frame an indicator that the hidden frame is empty.

12. The method of claim 9 wherein running a frame manager script further comprises:
starting the frame manager script by the script.

13. The method of claim 9 wherein:
the frame manager script is stored in a file on a user's local storage device.

14. The method of claim 1 wherein attempting to access the updated content file concerning the desired help topic outside of the compressed help file further comprises:
attempting to open a more recent Hypertext Markup Language file comprising content concerning the desired help topic.

15. The method of claim 14 wherein attempting to open a more recent Hypertext Markup Language file further comprises:
attempting to open a more recent Hypertext Markup Language file comprising content concerning the desired help topic, at a specific location on a user's local storage device.

16. The method of claim 1, further comprising:
loading into the hidden frame an indicator that the hidden frame is empty.

17. A computer program product for allowing display of the most recent version of content concerning a desired help topic, without requiring an update of an entire compressed help file, the computer program product being stored on a computer readable medium and comprising:
program code for determining if the computer program product is running in a top frame;
program code for creating a visible frame and a hidden frame, responsive to determining that the computer program product is running in the top frame;
program code for loading content concerning a desired help topic into the visible frame, responsive to determining that the computer program product is running in the top frame;
program code for determining whether the computer program product is running in the visible frame, responsive to determining that the computer program product is running in a frame that is not the top frame;
program code for determining whether the hidden frame is empty, responsive to determining that the computer program product is running in the visible frame;
program code for attempting to access an updated content file concerning the desired help topic outside of the compressed help file, responsive to determining that the hidden frame is empty;
program code for loading the updated content file concerning the desired help topic into the hidden frame, responsive to locating the updated content file concerning the desired help topic;
program code for terminating the operation of the computer program product, responsive to determining that the hidden frame is not empty; and
program code for loading the updated content file concerning the desired help topic into the visible frame, responsive to determining that the computer program product is running in a frame that is not the visible frame.

18. The computer program product of claim 17, further comprising:
program code for loading into the hidden frame an indicator that the hidden frame is empty, responsive to determining that the computer program product is running in the top frame.

19. A computer system for allowing access of an updated version of content concerning a desired help topic, without requiring an update of an entire compressed help file, the computer system comprising software portions stored on a computer readable medium and comprising:
a software portion configured for loading content concerning a desired help topic from the compressed help file into a top frame;
a software portion configured for running a script in the top frame, responsive to loading the content concerning the desired help topic into the top frame;
a software portion configured for creating a visible frame and a hidden frame, and loading the content concerning the desired help topic from the top frame into the visible frame, responsive to determining that the script is running in the top frame;
a software portion configured for running a second instance of the script in the visible frame, responsive to loading the content concerning the desired help topic into the visible frame;
a software portion configured for attempting to access an updated content file concerning the desired help topic outside of the compressed help file, responsive to determining that the second instance of the script is not running in the top frame, that the second instance of the script is running in the visible frame, and that the hidden frame is empty;
a software portion configured for performing one of the following steps, in response to results of attempting to access the updated content file concerning the desired help topic:
displaying the updated content file concerning the desired help topic, in response to successfully attempting to access the updated content file concerning the desired help topic; or
displaying the content concerning the desired help topic from the compressed help file, in response to unsuccessfully attempting to access the updated content file concerning the desired help topic.

20. The computer system of claim 19, further comprising:
a software portion configured for loading into the hidden frame an indicator that the hidden frame is empty, responsive to determining that the computer program product is running in the top frame.

* * * * *